United States Patent [19]

Li

[11] 4,109,073

[45] Aug. 22, 1978

[54] POLYMERIZATES OF OLEFINIC NITRILES CONTAINING INDENE

[75] Inventor: George S. Li, Aurora, Ohio

[73] Assignee: The Standard Oil Company, Cleveland, Ohio

[21] Appl. No.: 806,847

[22] Filed: Jun. 15, 1977

[51] Int. Cl.$^2$ .................. C08F 32/08; C08F 26/00; C08F 4/30
[52] U.S. Cl. ............................ 526/280; 526/193; 526/229.5; 526/248
[58] Field of Search ............................ 526/280, 248

[56] References Cited

U.S. PATENT DOCUMENTS

| | | | |
|---|---|---|---|
| 2,856,389 | 10/1958 | Fusco et al. | 526/280 |
| 3,926,926 | 12/1975 | Li et al. | 526/266 |
| 3,997,709 | 12/1976 | Aziz et al. | 526/280 |

*Primary Examiner*—Herbert J. Lilling
*Attorney, Agent, or Firm*—John F. Jones; Larry W. Evans

[57] ABSTRACT

Polymeric compositions which are high softening thermoplastics are composed of an olefinically unsaturated nitrile, such as acrylonitrile, a vinyl halide, such as vinyl chloride, and indene.

6 Claims, No Drawings

POLYMERIZATES OF OLEFINIC NITRILES CONTAINING INDENE

The present invention relates to novel polymeric compositions which are thermoplastic and have high softening temperatures, and more particularly pertains to high softening thermoplastic compositions which are composed of the essential components of an olefinically unsaturated nitrile, a vinyl halide, and indene, and to a process for preparing them.

The novel polymeric products of the present invention are prepared by polymerizing an olefinically unsaturated nitrile, such as acrylonitrile, a vinyl halide, such as vinyl chloride, and indene.

The olefinically unsaturated nitriles useful in this invention are the alpha,beta-olefinically unsaturated mononitriles having the structure

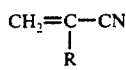

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The preferred olefinically unsaturated nitrile in the present invention is acrylonitrile.

The vinyl halides useful in this invention include vinyl chloride, vinyl bromide, vinyl iodide and vinyl fluoride. Most preferred is vinyl chloride.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is aqueous emulsion or suspension polymerization. The polymerization is preferably carried out in an aqueous medium in the presence of an emulsifier or suspending agent and a free-radical generating polymerization initiator at a temperature of from about 0° to 100° C in the substantial absence of molecular oxygen.

The preferred polymeric compositions embodied herein are those resulting from the copolymerization of (A) from about 30 to 80% by weight of at least one nitrile having the structure

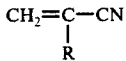

wherein R has the foregoing designation, (B) from about 5 to 60% by eight of a vinyl halide, and (C) from about 5 to 30% by weight of indene, wherein the given percentages of (A), (B) and (C) are based on the combined weight of (A) plus (B) plus (C).

More specifically, this invention can be illustrated in the polymerization of a mixture of acrylonitrile, vinyl chloride and idene to produce a thermoplastic product having a good ASTM heat-distortion temperature. Preferably, the acrylonitrile-vinyl chloride-indene monomer component should contain 35 to 70% by weight of acrylonitrile, 10 to 50% by weight of vinyl chloride and 5 to 20% by weight of indene.

The novel polymeric products of the present invention are thermoplastic materials which can be thermoformed into a wide variety of useful articles in any of the conventional ways employed with known thermoplastic polymeric materials, such as by extrusion, milling, molding, drawing, blowing, injecting, etc. The polymeric products of this invention have excellent solvent resistance and they are particularly useful in the manufacture of bottles, pipe, film, rod, and other useful articles.

In the following illustrative examples, the amounts of ingredients are expressed in parts by weight unless otherwise indicated.

EXAMPLE 1

A. A polymer was prepared in aqueous emulsion using the following ingredients:

| Ingredient | Parts |
|---|---|
| acrylonitrile | 55 |
| vinyl chloride | 40 |
| indene | 5 |
| water | 250 |
| Gafac RE-610 emulsifier* | 2.5 |
| n-dodecyl mercaptan | 0.04 |
| potassium persulfate | 0.3 |

* A mixture of $R-O-(CH_2CH_2O-)_nPO_3M_2$ and $[R-O-(CH_2CH_2O-)_n]_2PO_2M$ wherein n is a number of from 1 to 40, R is an alkyl or alkaryl group and preferably a nonyl phenyl group, and M is hydrogen, ammonia or an alkali metal, which composition is sold by GAF Corporation.

The polymerization reaction was carried out at 60° C for 16 hours with constant stirring and in a nitrogen atmosphere. The resulting latex was coagulated with boiling aqueous alum solution. The solid polymer was washed and dried at reduced pressure and 60° C for 48 hours. This resin was found to have an ASTM heat-distortion temperature of 96° C, a flexural strength of $12.2 \times 10^3$ psi, a flexural modulus of $6.16 \times 10^5$ psi, a tensile strength of $7.79 \times 10^3$ psi and a Rockwell hardness (M) of 107.

B. A polymer which is outside the scope of this invention was prepared by the procedure of A of this Example using 50 parts of acrylonitrile, 50 parts of vinyl chloride and no indene. The resulting polymer was found to have an ASTM heat-distortion temperature of 90° C, a flexural strength of $4.94 \times 10^3$ psi, a flexural modulus of $5.51 \times 10^5$ psi, a tensile strength of $3.99 \times 10^3$ psi and a Rockwell hardness (M) of 103.

C. Another experiment which is outside the scope of this invention was attempted as in B above using 50 parts of vinyl chloride, 50 parts of indene and no acrylonitrile. No polymer was formed.

EXAMPLE 2

The procedure of Example 1A was repeated except that 70 parts of acrylonitrile, 10 parts of vinyl chloride and 20 parts of indene were used. The resulting resin was thermoplastic and had an ASTM heat-distortion temperature of 106° C.

EXAMPLE 3

The procedure of Example 1A was repeated except that 70 parts of acrylonitrile, 15 parts of vinyl chloride and 15 parts of indene were used. The resulting resin was thermoplastic and had an ASTM heat-distortion temperature of 106° C and a Rockwell hardness (M) of 105.

EXAMPLE 4

The procedure of Example 1A was repeated except that 65 parts of acrylonitrile, 20 parts of vinyl chloride and 15 parts of indene were used. The resulting resin was thermoplastic and had an ASTM heat-distortion temperature of 103° C.

EXAMPLE 5

The procedure of Example 1A was repeated except that 60 parts of acrylonitrile, 25 parts of vinyl chloride and 15 parts of indene were used. The resulting resin was thermoplastic and had an ASTM heat-distortion temperature of 106° C.

EXAMPLE 6

The procedure of Example 1A was repeated except that 50 parts of acrylonitrile, 35 parts of vinyl chloride and 15 parts of indene were used. The resulting resin had an ASTM heat-distortion temperature of 101° C and a Rockwell hardness (M) of 104.

EXAMPLE 7

The procedure of Example 1A was repeated except that 40 parts of acrylonitrile, 50 parts of vinyl chloride and 10 parts of indene were used. The resulting resin had an ASTM heat-distortion temperature of 98° C.

EXAMPLE 8

The procedure of Example 1A was repeated except that 35 parts of acrylonitrile, 50 parts of vinyl chloride and 15 parts of indene were used. The resulting resin had an ASTM heat-distortion temperature of 100° C.

I claim:

1. The polymer composition resulting from the copolymerization in the presence of a free-radical initiator of
(A) from about 35 to 70% by weight of at least one nitrile having the structure $$CH_2=C-CN$$
$$\phantom{CH_2=C-}|$$
$$\phantom{CH_2=C-}R$$

wherein R is hydrogen, a lower alkyl group having from 1 to 4 carbon atoms, or a halogen,
(B) from about 10 to 50% by weight of a vinyl halide, and
(C) from about 5 to 20% by weight of indene, wherein the given percentages of (A), (B) and (C) are based on the combined weight of (A) plus (B) plus (C).

2. The composition of claim 1 wherein (A) is acrylonitrile.

3. The composition of claim 2 wherein (B) is vinyl chloride.

4. The process comprising polymerizing in an aqueous medium in the presence of a free-radical initiator and in the substantial absence of molecular oxygen
(A) from about 35 to 70% by weight of at least one nitrile having the structure $$CH_2=C-CN$$
$$\phantom{CH_2=C-}|$$
$$\phantom{CH_2=C-}R$$

wherein R is hydrogen, a lower alkyl group having from 1 to 4 carbon atoms, or a halogen,
(B) from about 10 to 50% by weight of a vinyl halide, and
(C) from about 5 to 20% by weight of indene, wherein the given percentages of (A), (B) and (C) are based on the combined weight of (A) plus (B) plus (C).

5. The process of claim 4 wherein (A) is acrylonitrile.

6. The process of claim 5 wherein (B) is vinyl chloride.

* * * * *